(12) United States Patent
Longshaw (10) Patent No.: US 12,159,205 B2
(45) Date of Patent: Dec. 3, 2024

(54) MACHINE LEARNING MODEL SCENARIO-BASED TRAINING SYSTEM

(71) Applicant: BANK OF AMERICA CORPORATION, Charlotte, NC (US)

(72) Inventor: Kenneth Longshaw, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 829 days.

(21) Appl. No.: 17/359,862

(22) Filed: Jun. 28, 2021

(65) Prior Publication Data

US 2022/0414532 A1   Dec. 29, 2022

(51) Int. Cl.
*G06N 20/00*   (2019.01)
*G06N 5/04*    (2023.01)

(52) U.S. Cl.
CPC .............. *G06N 20/00* (2019.01); *G06N 5/04* (2013.01)

(58) Field of Classification Search
CPC ...................................................... G06N 20/00
USPC .......................................................... 706/14
See application file for complete search history.

(56) References Cited

U.S. PATENT DOCUMENTS

| | | | | |
|---|---|---|---|---|
| 9,449,283 B1* | 9/2016 | Purpura | ................ | G06N 20/00 |
| 10,600,000 B2* | 3/2020 | Shamir | ................ | G06N 20/00 |
| 10,911,468 B2* | 2/2021 | Muddu | ............... | G06F 3/04847 |
| 11,176,206 B2* | 11/2021 | Adir | ....................... | G06N 5/045 |
| 11,475,072 B2* | 10/2022 | Mueller | ................ | G06N 20/10 |
| 11,514,364 B2* | 11/2022 | Elisha | .................. | G06Q 30/016 |
| 11,544,630 B2* | 1/2023 | Karnagel | ............... | G06N 3/045 |
| 11,636,387 B2* | 4/2023 | Elisha | .................... | G06N 20/00 706/14 |
| 11,741,356 B2* | 8/2023 | Moon | .................... | G06T 11/003 706/19 |
| 11,782,877 B1* | 10/2023 | Longshaw | .......... | G06F 11/3438 707/690 |
| 2018/0336467 A1* | 11/2018 | Guttmann | ................ | G06F 7/14 |
| 2019/0004920 A1* | 1/2019 | Vandriessche | ...... | G06F 11/3457 |
| 2019/0108471 A1* | 4/2019 | Widanapathirana | ........................ | G06Q 10/063114 |
| 2019/0332769 A1* | 10/2019 | Fralick | ..................... | H04L 9/30 |
| 2019/0334786 A1* | 10/2019 | Dutta | .................. | H04L 67/1097 |
| 2020/0034665 A1* | 1/2020 | Ghanta | .................... | G06F 17/18 |
| 2020/0126426 A1* | 4/2020 | Wright | .................. | B60W 40/10 |
| 2020/0410301 A1* | 12/2020 | Delay | ...................... | G08G 3/00 |
| 2021/0117719 A1* | 4/2021 | Tiwary | ...................... | G06N 7/01 |
| 2021/0192279 A1* | 6/2021 | Laaksonen | ............ | G16H 30/20 |
| 2022/0139117 A1* | 5/2022 | Zhang | ...................... | G06N 3/08 701/29.4 |
| 2022/0343192 A1* | 10/2022 | Kono | .................... | G06F 3/0653 |
| 2022/0414532 A1* | 12/2022 | Longshaw | ............... | G06N 5/04 |

(Continued)

*Primary Examiner* — Reza Nabi (74) *Attorney, Agent, or Firm* — Moore & Van Allen PLLC; James C. Edwards (57) ABSTRACT

A need to retrain a machine learning model is determined based on identification of either a new scenario (i.e., new grouping/population of data variables) or a modification to an existing/trained scenario (i.e., addition and/or deletion of data variables in an already trained scenario). Change occurring across all of the data variables used in training the machine learning model are monitored as opposed to monitoring only the data variables on an individual basis. When concurrent change occurs across multiple inter-related data variables, the need to add or modify a scenario (i.e., retrain a machine learning model) is identified.

20 Claims, 4 Drawing Sheets

(56) References Cited

U.S. PATENT DOCUMENTS

| | | | |
|---|---|---|---|
| 2023/0059265 A1* | 2/2023 | Watanabe | G06N 20/00 |
| 2023/0229973 A1* | 7/2023 | Elisha | G06N 5/04 |
| | | | 706/12 |
| 2024/0028722 A1* | 1/2024 | Longshaw | G06N 3/08 |
| 2024/0028726 A1* | 1/2024 | Longshaw | G06F 21/568 |

* cited by examiner

MACHINE LEARNING MODEL SCENARIO-BASED TRAINING SYSTEM

FIELD OF THE INVENTION

The present invention is generally directed to machine learning models and, more specifically, monitoring data that is used by a machine learning model to identify new scenarios or modification to existing scenarios, which require retraining of the machine learning model.

BACKGROUND

Machine learning models are files that have been trained to recognize certain types of patterns. Machine learning models are trained over a set of data, providing the model an algorithm that can be used to reason and learn from the set of data. As a result of the learning, the machine learning models are able to output a predicted result for the set of data. In specific instances the set of data includes one or more scenarios (i.e., groupings or populations of data variables), such that, the machine learning model is trained on each of the one or more scenarios and is able to output a predicted result for each of the scenarios.

Over time the data variables used to train the machine learning model tend to change and, as a result, the model does not perform as well as intended. Currently, data variable change is addressed on an individual data variable basis. This means that individual data variables are tracked for change in comparison to the data variable used to train the model, when a certain threshold level of change occurs, an alert is sent to an investigative entity to determine the impact of the data variable change on the model. However, the resulting investigation/analysis of the impact of an individual data variable change on the model is often not enough to determine whether the model requires retraining (i.e., update to scenarios and/or data variables). This is because in many instances the data variables are inter-related and change occurs simultaneously. Thus, while an individual data variable may not change by an amount that exceeds the prescribed threshold level, a certain collective grouping of data variables may change in unison, and the collective level of change of the group of data variables may warrant retraining of the model.

Therefore, a need exists to develop systems, methods, computer program products and the like which are capable of identifying a need to retrain a machine learning model based on changes in data variables. In this regard, the desired systems, methods, computer program products should take into account the fact that data variables are inter-related and that concurrent change amongst a group of data variables may give rise to the need to retrain a machine learning model. Moreover, in instances in which a machine learning model is trained on one or more scenarios, the desired invention should be able to identify data variable changes that warrant either a new scenario (i.e., new grouping of data variables) or modification to an existing/trained scenario (i.e., addition or deletion of data variables from the scenario).

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for determining a need to retrain a machine learning model based on identification of either a new scenario (i.e., new group of data variables) or a modification to an existing/trained scenario (i.e., addition and/or deletion of data variables in the scenario). In this regard, the present invention does not rely solely on monitoring change to individual data variables but rather monitors change occurring across all of the data variables used in training the machine learning model and, specifically, monitoring for changes that occur in data variables in relation to change concurrently occurring in other data variables.

Specifically, the present invention implements a machine learning model that monitors data variables for collective levels of concurrent/simultaneous change. In this regard, the present invention provides for one machine learning model to monitor the production data being used in another machine learning model. As a result of determining collective levels of change amongst groupings of data variables, the present invention identifies a need to either add a new scenario or modify an existing/trained scenario.

In specific embodiments of the invention, multivariate analysis, such as implementation of one or more clustering algorithms is used to identify new scenarios and/or the need to modify existing/trained scenarios.

In additional embodiments of the invention, the data that is monitored not only includes the data variables which were used to train the machine learning model or data variables considered for training/retraining the model, but also other data which may assist in identifying new scenarios and/or the need to modify existing/trained scenarios.

A system for identifying a need to retrain a machine learning model defines first embodiments of the invention. The system includes a first computing platform having a first memory and one or more first processing devices in communication with the first memory. The first memory stores a first machine learning model that is executable by the one or more first processing devices. The first machine learning model is trained based on a plurality of scenarios; each scenario includes a plurality of data variables that have an impact on a predictive output of the first machine learning model. The system additionally includes a second computing platform having a second memory and one or more second processing devices in communication with the second memory. The second memory stores a second machine learning model that is executable by the one or more second processing devices. The second machine learning model is configured to monitor, on a continuous basis, a first data set consisting of the plurality of data variables, and, in response to monitoring, determine concurrent changes in a plurality of the data variables in the first data set. The second machine learning model is further configured to identify (i) an additional scenario to add to the plurality scenarios, or (ii) a modification (i.e., adding or deleting to the data variables that form the scenario) to one of the plurality of scenarios based on the concurrent changes in the plurality of data variables. In response to identifying the additional scenario or the modification to an existing scenario, the first machine learning model is re-trained with the additional scenario or the modification to the existing scenario.

In specific embodiments of the system, the second machine learning model is further configured to identify (i) an additional scenario to add to the plurality scenarios, or (ii) a modification to one of the plurality of scenarios by comparing the concurrent changes in the plurality of data variables to a baseline data variable level for each of the plurality of scenarios.

In other specific embodiments of the system, the second machine learning model implements multivariate analysis to determine the concurrent changes in a plurality of the data variables in the first data set and identify (i) the additional scenario to add to the plurality scenarios, or (ii) the modification to one of the plurality of scenarios based on the concurrent changes in the plurality of data variables. In specific such embodiments of the system, the second machine learning model comprises one or more clustering algorithms configured to identify (i) the additional scenario to add to the plurality scenarios based on an output of the one or more clustering algorithms indicating a presence of a previously unknown cluster, or (ii) the modification to one of the plurality of scenarios based on an output of the one or more clustering algorithms indicating changes to a cluster associated with one the one of the plurality of scenarios.

In still further specific embodiments of the system, the second machine learning model is further configured to monitor, on a continuous basis, a second data set comprising data other than the data variables and, in response to the monitoring, determine changes in the data that occur concurrent with the concurrent changes in the data variables. In such embodiments of the system, the second machine learning model is further configured to identify (i) the additional scenario to add to the plurality scenarios, (ii) the modification to one of the plurality of scenarios based on (a) the concurrent changes in the plurality of the data variables and (b) additional changes to the data.

In other specific embodiments of the system, the second machine learning model is further configured to generate and initiate communication of an alert that indicates a need to retrain the first machine learning algorithm based on identification of (i) the additional scenario to add to the plurality scenarios, or (ii) the modification to one of the plurality of scenarios. In such embodiments the system may also include a third computing platform including a third memory and one or more third processing devices in communication with the third memory. The third memory stores the dashboard application that is executable by the one or more third processing devices, The dashboard application is configured to receive the alert and provide a user interface that displays a need to retrain the first machine learning algorithm based on identification of (i) the additional scenario to add to the plurality scenarios, or (ii) the modification to one of the plurality of scenarios.

A computer-implemented method for identifying a need to retrain a machine learning model defines second embodiments of the invention. The computer-implemented method is executable by one or more computing processor devices. The method includes training a first machine learning model on a plurality of scenarios, each scenario comprising a plurality of data variables that impact a predictive output of the first machine learning model. In addition, the method includes monitoring, by a second machine learning model on a continuous basis, a first data set consisting of the data variables and, in response to the monitoring, determining, by the second machine learning model, concurrent changes in a plurality of the data variables in the first data set. Moreover, the method includes identifying, by the second machine learning model, (i) an additional scenario to add to the plurality scenarios, or (ii) a modification (i.e., adding or deleting to the data variables that form the scenarios to one of the plurality of scenarios based on the concurrent changes in the plurality of data variables. In response to the identifying, the first machine learning model is re-trained with the additional scenario or the modification to one of the plurality scenarios.

In specific embodiments of the computer-implemented method, determining further includes comparing the concurrent changes in the plurality of data variables to a baseline data variable level for each of the plurality of scenarios.

In other specific embodiments of the computer-implemented method, determining and identifying further include determining, by multivariate analysis, the concurrent changes in a plurality of the data variables in the first data set and identifying, by multivariate analysis, (i) the additional scenario to add to the plurality scenarios, or (ii) the modification to one of the plurality of scenarios based on the concurrent changes in the plurality of data variables.

In still further specific embodiments of the computer-implemented method, identifying further includes identifying, by implementing one or more clustering algorithms, (i) the additional scenario to add to the plurality scenarios based on an output of the one or more clustering algorithms indicating a presence of a previously unknown cluster or (ii) the modification to one of the plurality of scenarios based on an output of the one or more clustering algorithms indicating changes to a cluster associated with one the one of the plurality of scenarios.

Moreover, in further embodiments the computer-implemented method additionally includes monitoring, by the second machine learning model on a continuous basis, a second data set comprising data other than the data variables, and in response to the monitoring of the second data set, determining, by the second machine learning model, changes in the data that occur concurrent with the changes in the data variables. In such embodiments of the computer-implemented method, identifying further includes identifying, by the second machine learning model, (i) the additional scenario to add to the plurality scenarios, (ii) the modification to one of the plurality of scenarios based on (a) the changes in the plurality of the data variables and (b) additional changes to the data.

In still further specific embodiments the computer-implemented method additionally includes generating and initiating communication of an alert that indicates a need to retrain the first machine learning algorithm based on the identifying of (i) the additional scenario to add to the plurality scenarios, or (ii) the modification to one of the plurality of scenarios. In addition, the computer-implemented method includes executing a dashboard application that receives the alert and presents a user interface that displays a need to retrain the first machine learning algorithm based on the identifying of (i) the additional scenario to add to the plurality scenarios, or (ii) the modification to one of the plurality of scenarios.

A computer program product including a non-transitory computer-readable medium defines third embodiments of the invention. The non-transitory computer-readable medium includes a first set of codes for causing a computer to train a first machine learning model on a plurality of scenarios. Each scenario comprising a plurality of data variables that impact a predictive output of the first machine learning model. The computer readable medium additionally includes a second set of codes for causing a computer to monitor, by a second machine learning model on a continuous basis, a first data set consisting of the data variables, and a third set of codes for causing a computer to, in response to monitoring, determine, by the second machine learning model, concurrent changes in a plurality of the data variables in the first data set. In addition, the computer-readable medium includes a fourth set of codes for causing a computer to identify, by the second machine learning model, (i) an additional scenario to add to the plurality scenarios, or (ii) a modification (i.e., adding or deleting to the data variables that form one of the scenarios) to one of the plurality of scenarios based on the concurrent changes in the plurality of data variables. In response, the first machine learning model is re-trained with the additional scenario or the modification to one of the plurality scenarios.

In specific embodiments of the computer program product, the third set of codes is further configured to cause the computer to determine by comparing the concurrent changes in the plurality of data variables to a baseline data variable level for each of the plurality of scenarios.

In other specific embodiments of the computer program product, the third and fourth sets of codes are further configured to cause the computer to determine, by multivariate analysis, the concurrent changes in a plurality of the data variables in the first data set and identify, by multivariate analysis, (i) the additional scenario to add to the plurality scenarios, or (ii) the modification to one of the plurality of scenarios based on the concurrent changes in the plurality of data variables. In specific embodiments of the computer program product, the fourth set of codes is further configured to cause the computer to identify, by implementing one or more clustering algorithms, (i) the additional scenario to add to the plurality scenarios based on an output of the one or more clustering algorithms indicating a presence of a previously unknown cluster or (ii) the modification to one of the plurality of scenarios based on an output of the one or more clustering algorithms indicating changes to a cluster associated with one the one of the plurality of scenarios.

Moreover, in additional embodiments of the computer program product, the computer-readable medium further includes a fifth set of codes for causing a computer to generate and initiate communication of an alert that indicates a need to retrain the first machine learning algorithm based on the identifying of (i) the additional scenario to add to the plurality scenarios, or (ii) the modification to one of the plurality of scenarios. In addition, computer-readable medium includes a sixth set of codes for causing a computer to execute a dashboard application that receives the alert and presents a user interface that displays a need to retrain the first machine learning algorithm based on the identifying of (i) the additional scenario to add to the plurality scenarios, or (ii) the modification to one of the plurality of scenarios.

Thus, according to embodiments of the invention, which will be discussed in greater detail below, the present invention provides for needs and/or achieves other advantages by determining a need to retrain a machine learning model based on identification of either a new scenario (i.e., new group of data variables) or a modification to an existing/trained scenario (i.e., addition and/or deletion of data variables in the scenario). Specifically, the present invention does not rely solely on monitoring change to individual data variables but rather monitors change occurring across all of the data variables used in training the machine learning model and specifically, monitoring for changes that occur in data variables in relation to change concurrently occurring in other data variables. As a result of determining that collective change amongst a group of data variables rises to a predetermined threshold level, the need to add or modify a scenario is identified and alerts can be communicated to entities/dashboard applications notifying such of the need.

The features, functions, and advantages that have been discussed may be achieved independently in various embodiments of the present invention or may be combined with yet other embodiments, further details of which can be seen with reference to the following description and drawings.

In additional specific embodiments of the computer program product, the second set of codes is further configured to cause the computer to monitor, by the second machine learning model on a continuous basis, a second data set comprising data other than the data variables. In addition, the third set of codes is further configured to cause the computer to, in response to monitoring of the second data set, determine, by the second machine learning model, changes in the data that occur concurrent with the changes in the data variables. Additionally, the fourth set of codes is further configured to cause the computer to identify, by the second machine learning model, (i) the additional scenario to add to the plurality scenarios, (ii) the modification to one of the plurality of scenarios based on (a) the changes in the plurality of the data variables and (b) additional changes to the data.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for determining a need to retrain a machine learning model based on identification of either a new scenario (i.e., new grouping/population of data variables) or a modification to an existing/trained scenario (i.e., addition and/or deletion of data variables in the scenario). In this regard, the present invention does not rely solely on monitoring change to individual data variables but rather monitors change occurring across all of the data variables used in training the machine learning model and, specifically, monitoring for changes that occur in data variables in relation to change concurrently occurring in other data variables.

Specifically, the present invention implements a machine learning model that monitors data variables for collective levels of concurrent/simultaneous change. In this regard, the present invention provides for one machine learning model to monitor the production data being used in another machine learning model. As a result of determining collective levels of change amongst groupings of data variables, the present invention identifies a need to either add a new scenario or modify an existing/trained scenario.

In specific embodiments of the invention, multivariate analysis, such as implementation of one or more clustering algorithms is used to identify new scenarios and/or the need to modify existing/trained scenarios. In such embodiments, existing scenarios (i.e., scenarios in which the machine learning model is already trained on) are viewed as known clusters, while new scenarios appear as new clusters.

In additional embodiments of the invention, the data that is monitored not only includes the data variables which were used to train the machine learning model or data variables considered for training/retraining the model, but also other data which changes over and time is related to the data variables, such that, the other data may assist in identifying new scenarios and/or the need to modify existing/trained scenarios.

Figure 1:
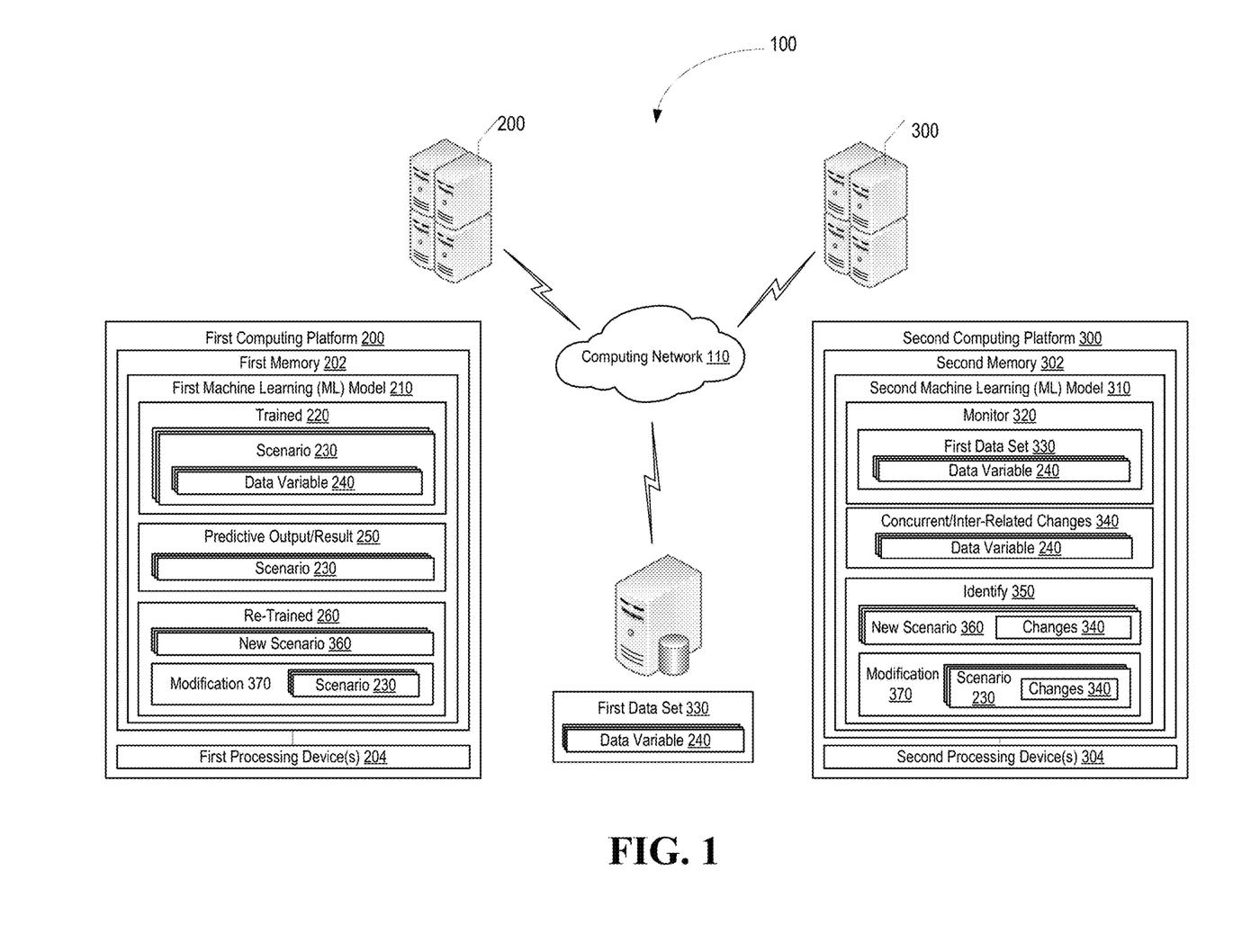
FIG. 1 is a schematic/block diagram of a system for identifying a need to retrain a machine learning model through a new or modified scenario, in accordance with embodiments of the present invention.

Referring to FIG. 1 a schematic/block diagram is presented of an exemplary system 100 for determining a need to retrain a machine learning model, in accordance with embodiments of the present invention. As depicted, the system 100 includes a first computing platform 200 having a first memory 202 and one or more first processing devices 204 in communication with the first memory 202. The first memory stores first machine learning model 210 that is executable by the first processing device(s) 204. The first machine learning model comprises one or more machine learning algorithms that are trained to provide a predictive output. Specifically, according to embodiments of the present invention, first machine learning model 210 is trained on one, and typically more, scenarios 230. A "scenario" as used herein is a grouping or population of data variables 240 that form an input set for determining a predictive output 250 for a corresponding scenario. As previously discussed, over time, new scenarios may emerge or the data variables that form a scenario may change. As a result, there is a need to retrain the machine learning model 210 over time.

System 100 additionally includes a second computing platform 300 having a second memory 302 and one or more second processing devices 304 in communication with second memory 302. Second memory 302 stores second machine learning model 310 that is trained to identify new emerging scenarios 360 or modifications to existing/trained scenarios 230. Specifically, second machine learning model 310 is configured to receive, via computing network 100, and monitor 320 a first set of data 330 that consists, exclusively, of data variables 240 (i.e., the same data set that is used in production use of the first machine learning model 210). In response to the monitoring 320, second machine learning model 310 is configured to determine concurrent and, in some embodiments, inter-related changes 340 amongst two or more of the data variables 240. Concurrent changes mean that the data variables change or are changing simultaneously (i.e., at least a portion of the time period during which change occurs overlaps). Inter-related change means that one data variable's change is dependent upon another data variable's change.

Further, second machine learning model 310 is configured to identify, based on the concurrent/inter-related changes 340 of the data variables 240, at least one of (i) one or more new/additional scenarios 360 that need to be added to the previously trained scenarios 230, and/or (ii) one or more modifications 370 to the previously trained scenarios 230. A modification 370 includes addition to and/or deletion of data variables that comprise a corresponding scenario 230.

In response to identifying (i) one or more new/additional scenarios 360 that need to be added to the previously trained scenarios 230, and/or (ii) one or more modifications 370 to the previously trained scenarios 230, the first machine learning model 210 may be re-trained 260 with the new scenario(s) 360 and/or the modifications 370 to previously trained scenarios 230. One of ordinary in skill in the art will appreciate that once the new scenarios 360 and/or the modification s 370 are identified further automated or manual analysis may be necessary prior to making a decision on whether to re-train the first machine learning module 210 with the new scenario(s) 360 and/or modifications 370.

Figure 2:
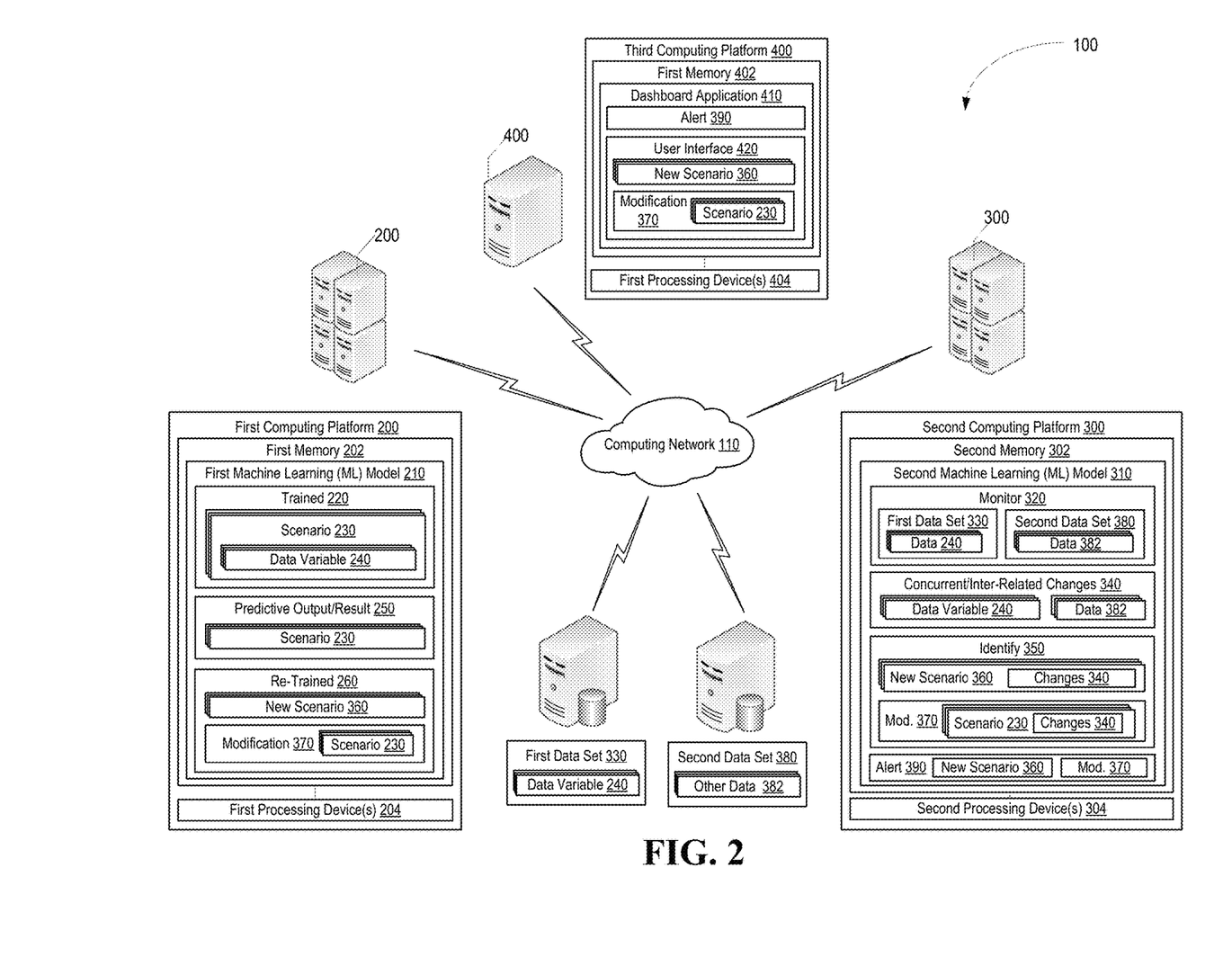
FIG. 2 is a schematic block diagram of an alternate system for identifying a need to retrain a machine learning model through a new or modified scenario, in accordance with alternate embodiments of the present invention.

Referring to FIG. 2, a block diagram is depicted of a system 100 for determining a need to retrain a machine learning model, in accordance with alternate embodiments of the present invention. The system 100 is similar in construct and function to the system 100 shown in FIG. 1, except for the additional features herein described below.

According to specific embodiments of the invention, the second machine learning model 310 is not only configured to receive and monitor 320 first data set 330 consisting of data variables 240 (i.e., the data set being currently used for production runs of the first machine learning model 210) but is also configured to receive, via computing network 110, and monitor a second data set 380 comprising other data 382 (i.e., data other than the data variables 240 comprising the first data set 330). The other data 382 may include any data that may impact the predictive output of the first machine learning module 210, such as, data that is related to a previously trained scenario 230, data variables 240 included in previously trained scenario 230 or the like. In such embodiments of the system 100, the second machine learning model 310 is further configured to, in response to monitoring 320 the other data 382, determine changes 340 in the other data 382 that occur concurrent with the changes 340 in the data variables 240 or, in some embodiments of the system 100, are inter-related to the changes 340 occurring in the data variables 240. Subsequently, the changes 340 in the other data 382 may be beneficial in pinpointing or refining the identification of a new scenario 360 and/or modifications 370 to a previously trained scenario 230.

In additional embodiments of the system, the second machine learning model 310 may include algorithms configured to, in response to identifying (i) one or more new/additional scenarios 360 that need to be added to the previously trained scenarios 230, and/or (ii) one or more modifications 370 to the previously trained scenarios 230, generate and initiate communication of an alert 390 that is configured to indicate a need to retrain the first machine learning model 210 based on identification of (i) the new/additional scenario(s) 360, and/or (ii) the modifications 370 to the previously trained scenarios 230. In such embodiments, the system 100 may also include a third computing platform 400 having a third memory 402 and one or more third processing device(s) 404 in communication with the third memory 402. Third memory 402 stores dashboard application 410 configured to receive the alert 390 and, in response, present a user interface 420 that displays notification of the (i) the new/additional scenario(s) 360, and/or (ii) the modifications 370 to the previously trained scenarios 230. In this regard, a analyst/user interfacing with the dashboard application can further analyze the (i) the new/additional scenario(s) 360, and/or (ii) the modifications 370 to the previously trained scenarios 230 and make decisions on whether to go forward with retraining the first machine learning model 210.

Figure 3:
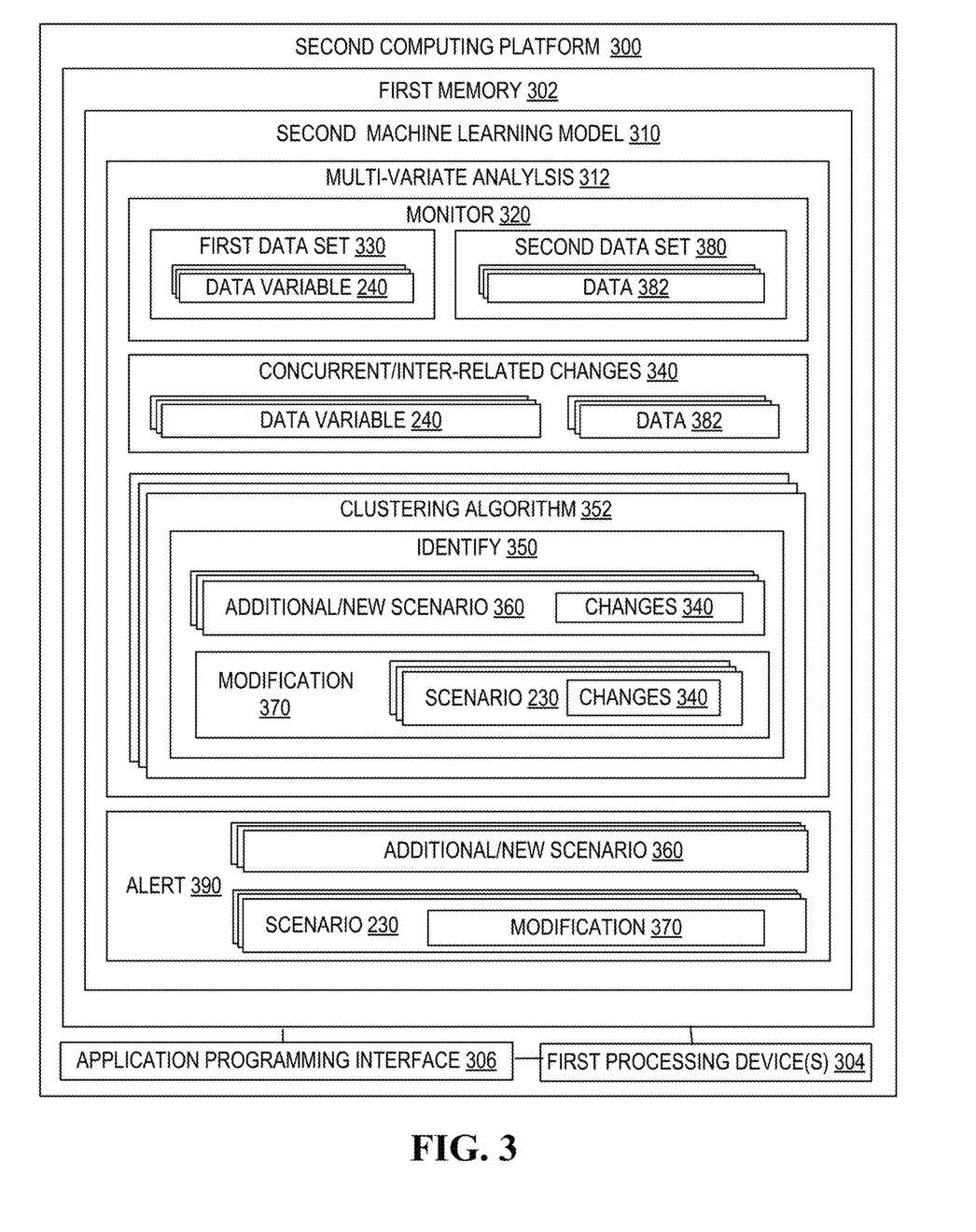
FIG. 3 is a block diagram of a second computing platform including a machine learning model configured for monitoring production data variables, determining concurrent changes amongst a plurality of the data variables and identifying new scenarios or a need to modify existing/trained scenarios, in accordance with embodiments of the present invention.

Referring to FIG. 3, a block diagram is depicted of second computing platform 300, in accordance with embodiments of the present invention. In addition to providing greater detail, FIG. 3 highlights various alternate embodiments of the system 100. Second computing platform 300 comprises one or more computing devices/apparatus, such as application server(s), storage servers or the like configured to execute software programs, including instructions, engines, algorithms, modules, routines, applications, tools, and the like. Second computing platform 300 includes second memory 302, which may comprise volatile and non-volatile memory, such as read-only and/or random-access memory (RAM and ROM), EPROM, EEPROM, flash cards, or any memory common to computer platforms). Moreover, second memory 302 may comprise cloud storage, such as provided by a cloud storage service and/or a cloud connection service.

Further, second computing platform 300 also includes second processing device(s) 304, which may be an application-specific integrated circuit ("ASIC"), or other chipset, logic circuit, or other data processing device. Second processing device 304 may execute an application programming interface ("API") 306 that interfaces with any resident programs, such as second machine learning model 310 and algorithms, sub-engines/routines associated therewith or the like stored in the second memory 302 of the second computing platform 300.

Second processing device 304 may include various processing subsystems (not shown in FIG. 3) embodied in hardware, firmware, software, and combinations thereof, that enable the functionality of second computing platform 300 and the operability of second computing platform 300 on a distributed communication network. For example, processing subsystems allow for initiating and maintaining communications and exchanging data with other networked devices. For the disclosed aspects, processing subsystems of second processing device 304 may include any subsystem used in conjunction with second machine learning model 310 and related sub-engines/routines, algorithms, sub-algorithms, modules, sub-modules thereof.

Second computing platform 300 additionally includes a communications module (not shown in FIG. 3) embodied in hardware, firmware, software, and combinations thereof, that enables electronic communications between second computing platform 300 and other networks and/or networked devices, such as, first computing platform 100, third computing platform 400, computing network 110 and the like. Thus, the communication module may include the requisite hardware, firmware, software and/or combinations thereof for establishing and maintaining a network communication connection with one or more systems, platforms, networks, or the like.

As previously discussed in relation to FIGS. 1 and 2, second memory 302 of second computing platform 300 stores second machine learning model 310 that is configured to be trained to identify (i) the new/additional scenario(s) 360, and/or (ii) the modifications 370 to the previously trained scenarios 230. In specific embodiments of the invention, second machine learning model 310 implements multivariant analysis 212 to monitor and determine changes in data variables 240 and identify (i) the new/additional scenario(s) 360, and/or (ii) the modifications 370 to the previously trained scenarios 230 based on the changes. Multivariant analysis 212 is based on the principles of multivariate statistics. Typically, multivariate analysis 212 is used to address situations in which multiple measurements are made on each datum and the relations among measurements and their structures are important. In this regard, multivariant analysis 212 may include normal and general multivariate models and distribution theory, the study and measurement of relationships, probability computations of multidimensional regions and the exploration of data structures and patterns. In specific embodiments of the invention multivariant analysis 212 may include one or more clustering algorithms 352, discussed in detail below in relation to identifying (i) the new/additional scenario(s) 360, and/or (ii) the modifications 370 to the previously trained scenarios 230 based on the changes. In other embodiments of the invention, multivariate analysis 312 may include, but is not limited to, one or more of principle components analysis (PCA), multivariate regression, multivariate analysis of variance (MANOVA), factor analysis, canonical correlation analysis, redundancy analysis, correspondence analysis (CA), canonical correspondence analysis (CCA), multidimensional scaling, discriminant analysis, line discriminant analysis (LDA), artificial neural networks and the like.

Second machine learning model 310 is configured to receive and monitor 320 a first set of data 330 that consists, exclusively, of data variables 240 (i.e., the same data set that is used in production use of the first machine learning model 210) and, in specific embodiments second data set 380 that comprises other data 382 (i.e., data not included in the first data set). In response to the monitoring 320, second machine learning model 310 is configured to determine concurrent and, in some embodiments, inter-related changes 340 amongst two or more of the data variables 240 and, in some embodiments changes in other data 382 that occur concurrently with the changes 340 in the data variables 240 and/or are otherwise inter-related. Concurrent changes mean that the data variables change or are changing simultaneously (i.e., at least a portion of the time period during which change occurs overlaps). Inter-related change means that one data variable's change is dependent upon another data variable's change.

Further, second machine learning model 310 is configured to identify, based on the concurrent/inter-related changes 340 of the data variables 240, at least one of (i) one or more new/additional scenarios 360 that need to be added to the previously trained scenarios 230, and/or (ii) one or more modifications 370 to the previously trained scenarios 230. A modification 370 includes addition to and/or deletion of data variables that comprise a corresponding scenario 230.

In specific embodiments of the invention, one or more clustering algorithms 352 are implemented to identify the (i) new/additional scenarios 360, and/or (ii) modifications 370 to the previously trained scenarios 230. Clustering analysis or clustering is the task of grouping a set of objects (in this instance, data variables) in such a way that objects in the same group, called a cluster, are more similar in some sense (in this instance, forming a scenario) to each other than to those of other clusters. Clustering algorithms 352, as used herein, may include, but is not limited to, hierarchical clustering algorithms; centroid models, such as K-means algorithms, distribution models; density models; subspace models; group models; graph-based models; signed-graph models; neural models, such as unsupervised neural networks; and the like. In this regard, a clustering algorithm may identify a cluster not previously seen (i.e., a scenario on which the first machine learning model 210 is not currently trained on) or may observe changes in previously clusters (i.e., addition or deletion of data variables is a previously trained scenario).

It should be noted that multivariate analysis 212, including but not limited to, clustering algorithms 352 may provide for weighting of data variables 230 in relation to their significance in determining a predictive output for a corresponding scenario 230 or 360. In this regard, data variables that have a greater impact on determining a predictive output for a corresponding scenario 230 may be provided a greater/higher weighting, while data variables 230 having less of an impact on determining a predictive output for a corresponding scenario 230 may be provided a lower weighting.

In addition, as discussed in relation to FIG. 2, the second machine learning model 310 may include algorithms configured to, in response to identifying (i) one or more new/additional scenarios 360 that need to be added to the previously trained scenarios 230, and/or (ii) one or more modifications 370 to the previously trained scenarios 230, generate and initiate communication of an alert 390 that is configured to indicate a need to retrain the first machine learning model 210 based on identification of (i) the new/additional scenario(s) 360, and/or (ii) the modifications 370 to the previously trained scenarios 230. The alert may be communicated to a corresponding dashboard application and/or communicated directly to one or more entities/analysts or the like.

Figure 4:
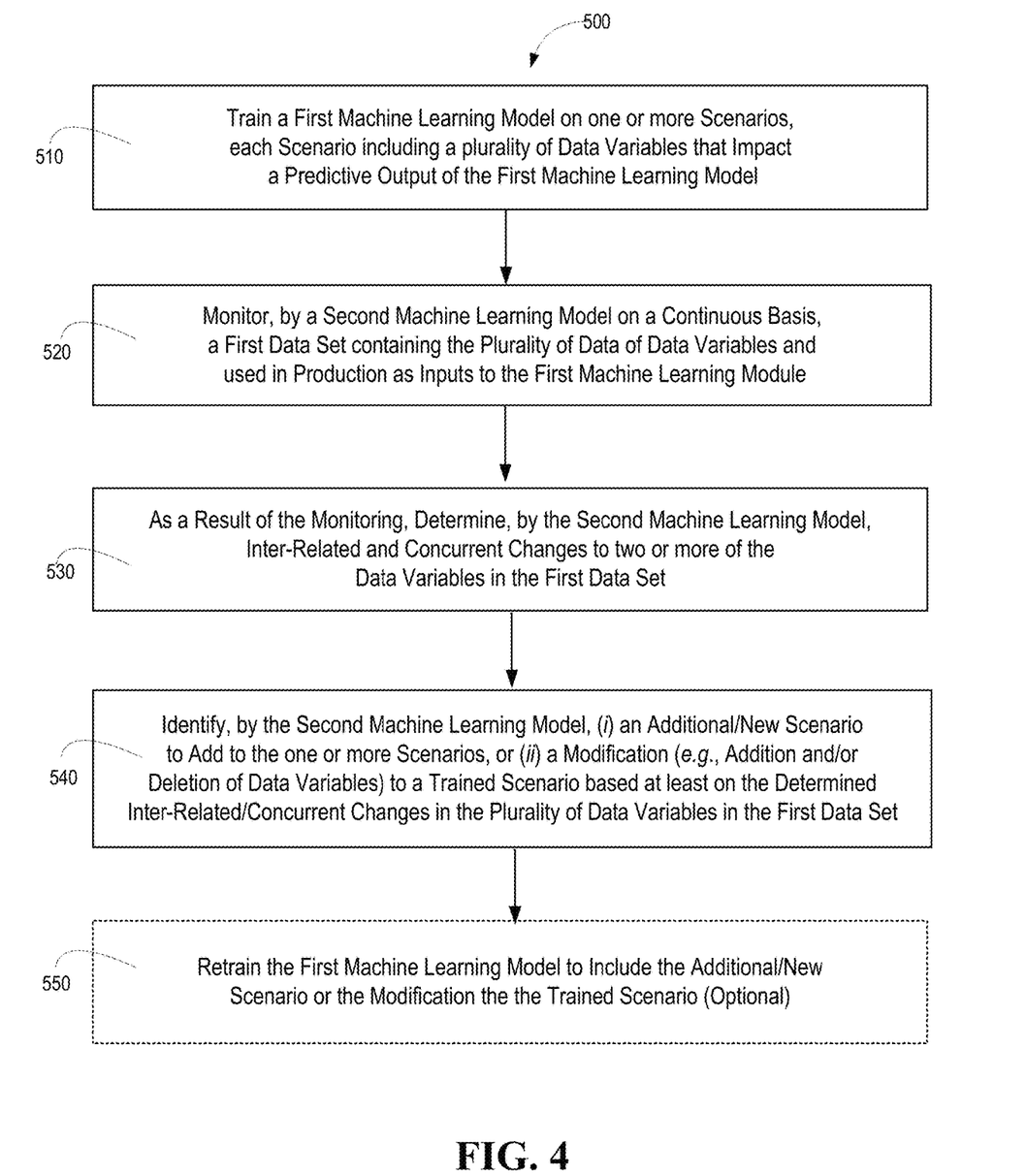
FIG. 4 is a flow diagram of a method for identifying a need to retrain a machine learning model through a new or modified scenario, in accordance with embodiments of the present invention.

Referring to FIG. 4, a flow diagram is depicted of a method 500 for determining a need a need to retrain a machine learning model, in accordance with embodiments of the present invention. At Event 510, a first machine learning model is trained on one, and typically more, scenarios. Each scenario, also referred to herein as a grouping or population includes a plurality of data variables that have an impact on the predictive output of the corresponding scenario. As previously discussed, over time, changes in data occur that have an impact on the effectiveness of the first machine learning model and, therefore, over time, the first training module will have a need to undergo re-training.

At Event 520, a second machine learning model, which may include multivariate analysis, such as, in specific embodiments one or more clustering algorithms, is configured to receive and monitor, on a continuous basis (i.e., dynamically as data is provided to the first machine learning model in production use), a first data set that consists, solely, of the plurality of data variables that comprise the one or more scenarios on which the first machine learning model has been trained. In this regard, the first data set that is being monitored is the same data set currently being inputted in a production run of the first machine learning model. In optional embodiments of the invention, the second machine learning model additionally receives and monitors other data that has an impact on the predicted results of the scenarios or are related to change occurring in the data variables.

As a result of the monitoring, at Event 530, the second machine learning model determines concurrent and, in some embodiments of the method, inter-related changes to two or more of data variables in the first data set. Concurrent changes mean that the data variables change or are changing simultaneously (i.e., at least a portion of the time period during which change occurs overlaps). Inter-related change means that one data variable's change is dependent upon another data variable's change.

At Event 540, the second machine learning model and, in specific embodiments of the method, one or more clustering algorithms identifies, (i) one or more new/additional scenarios that may need to be added to the previously trained scenarios, and/or (ii) one or more modifications (i.e., addition and/or deletion of data variables) to the previously trained scenarios.

At Optional Event 550, the first machine learning model is retrained on the (i) new/additional scenarios, and/or (ii) modifications to the previously trained scenarios.

Thus, as described in detail above, present embodiments of the invention include systems, methods, computer program products and/or the like for determining a need to retrain a machine learning model based on identification of either a new scenario (i.e., new grouping/population of data variables) or a modification to an existing/trained scenario (i.e., addition and/or deletion of data variables in an already trained scenario). Specifically, the present invention does not rely solely on monitoring change to individual data variables but rather monitors change occurring across all of the data variables used in training the machine learning model and specifically, monitoring for changes that occur in data variables in relation to change concurrently occurring in other data variables. As a result of determining that collective change amongst a group of data variables rises to a predetermined threshold level, the need to add or modify a scenario is identified.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying a need to retrain a machine learning model, the system comprising:
a first computing platform including a first memory and one or more first processing devices in communication with the first memory, wherein the first memory stores a first machine learning model that is executable by the one or more first processing devices and is trained based on a plurality of scenarios, each scenario comprising a plurality of data variables that have an impact on a predictive output of the first machine learning model; and
a second computing platform including a second memory and one or more second processing devices in communication with the second memory, wherein the second memory stores a second machine learning model that is executable by the one or more second processing devices and is configured to:
monitor, on a continuous basis, a first data set consisting of the data variables,
in response to monitoring, determine concurrent changes in a plurality of the data variables in the first data set; and
identify (i) an additional scenario to add to the plurality scenarios, or (ii) a modification to one of the plurality of scenarios based on the concurrent changes in the plurality of data variables, wherein the modification comprises at least one of adding or deleting to the data variables that form the one of the plurality of scenarios,
wherein the first machine learning model is configured to be re-trained, in response to determining a collective change associated with the concurrent changes in the plurality of data variables rises to a predetermined threshold, with the additional scenario or the modification to one of the plurality scenarios.

2. The system of claim 1, wherein the second machine learning model is further configured to identify (i) an additional scenario to add to the plurality scenarios, or (ii) a modification to one of the plurality of scenarios by comparing the concurrent changes in the plurality of data variables to a baseline data variable level for each of the plurality of scenarios.

3. The system of claim 1, wherein the second machine learning model implements multivariate analysis to determine the concurrent changes in a plurality of the data variables in the first data set and identify (i) the additional scenario to add to the plurality scenarios, or (ii) the modification to one of the plurality of scenarios based on the concurrent changes in the plurality of data variables.

4. The system of claim 3, wherein the second machine learning model comprises one or more clustering algorithms configured to identify the additional scenario to add to the plurality scenarios based on an output of the one or more clustering algorithms indicating a presence of a previously unknown cluster.

5. The system of claim 4, wherein the one or more clustering algorithms are further configured to identify the modification to one of the plurality of scenarios based on an output of the one or more clustering algorithms indicating changes to a cluster associated with one the one of the plurality of scenarios.

6. The system of claim 1, wherein the second machine learning model is further configured to:

monitor, on a continuous basis, a second data set comprising data other than the data variables, in response to the monitoring, determine changes in the data that occur concurrent with the concurrent changes in the data variables, and identify (i) the additional scenario to add to the plurality scenarios, (ii) the modification to one of the plurality of scenarios based on (a) the concurrent changes in the plurality of the data variables and (b) additional changes to the data.

7. The system of claim 1, wherein the second machine learning model is further configured to generate and initiate communication of an alert that indicates a need to retrain the first machine learning algorithm based on identification of (i) the additional scenario to add to the plurality scenarios, or (ii) the modification to one of the plurality of scenarios.

8. The system of claim 7, further comprising a third computing platform including a third memory and one or more third processing devices in communication with the third memory, wherein the third memory stores a dashboard application that is executable by the one or more third processing devices and configured to receive the alert and provide a user interface that displays a need to retrain the first machine learning algorithm based on identification of (i) the additional scenario to add to the plurality scenarios, or (ii) the modification to one of the plurality of scenarios.

9. A computer-implemented method for identifying a need to retrain a machine learning model, the computer-implemented method is executable by one or more computing processor devices, the method comprising:

training a first machine learning model on a plurality of scenarios, each scenario comprising a plurality of data variables that impact a predictive output of the first machine learning model;

monitoring, by a second machine learning model on a continuous basis, a first data set consisting of the data variables;

in response to the monitoring, determining, by the second machine learning model, concurrent changes in a plurality of the data variables in the first data set; and identifying, by the second machine learning model, (i) an additional scenario to add to the plurality scenarios, or (ii) a modification to one of the plurality of scenarios based on the concurrent changes in the plurality of data variables, wherein the modification comprises at least one of adding or deleting to the data variables that form the one of the plurality of scenarios, wherein the first machine learning model is re-trained, in response to determining a collective change associated with the concurrent changes in the plurality of data variables rises to a predetermined threshold, with the additional scenario or the modification to one of the plurality scenarios.

10. The computer-implemented method of claim 9, determining further comprises comparing the concurrent changes in the plurality of data variables to a baseline data variable level for each of the plurality of scenarios.

11. The computer-implemented method of claim 9, wherein determining and identifying further comprise determining, by multivariate analysis, the concurrent changes in a plurality of the data variables in the first data set and identifying, by multivariate analysis, (i) the additional scenario to add to the plurality scenarios, or (ii) the modification to one of the plurality of scenarios based on the concurrent changes in the plurality of data variables.

12. The computer-implemented method of claim 11, wherein identifying further comprises identifying, by implementing one or more clustering algorithms, (i) the additional scenario to add to the plurality scenarios based on an output of the one or more clustering algorithms indicating a presence of a previously unknown cluster or (ii) the modification to one of the plurality of scenarios based on an output of the one or more clustering algorithms indicating changes to a cluster associated with one the one of the plurality of scenarios.

13. The computer-implemented method of claim 9, further comprising:

monitoring, by the second machine learning model on a continuous basis, a second data set comprising data other than the data variables; and in response to the monitoring of the second data set, determining, by the second machine learning model, changes in the data that occur concurrent with the changes in the data variables, and wherein identifying further comprises identifying, by the second machine learning model, (i) the additional scenario to add to the plurality scenarios, (ii) the modification to one of the plurality of scenarios based on (a) the changes in the plurality of the data variables and (b) additional changes to the data.

14. The computer-implemented method of claim 9, further comprising:

generating and initiating communication of an alert that indicates a need to retrain the first machine learning algorithm based on the identifying of (i) the additional scenario to add to the plurality scenarios, or (ii) the modification to one of the plurality of scenarios; and executing a dashboard application that receives the alert and presents a user interface that displays a need to retrain the first machine learning algorithm based on the identifying of (i) the additional scenario to add to the plurality scenarios, or (ii) the modification to one of the plurality of scenarios.

15. A computer program product including a non-transitory computer-readable medium, the non-transitory computer-readable medium comprising:

a first set of codes for causing a computer to train a first machine learning model on a plurality of scenarios, each scenario comprising a plurality of data variables that impact a predictive output of the first machine learning model;

a second set of codes for causing a computer to monitor, by a second machine learning model on a continuous basis, a first data set consisting of the data variables;

a third set of codes for causing a computer to, in response to monitoring, determine, by the second machine learning model, concurrent changes in a plurality of the data variables in the first data set; and a fourth set of codes for causing a computer to identify, by the second machine learning model, (i) an additional scenario to add to the plurality scenarios, or (ii) a modification to one of the plurality of scenarios based on the concurrent changes in the plurality of data variables, wherein the modification comprises at least one of adding or deleting to the data variables that form the one of the plurality of scenarios, wherein the first machine learning model is re-trained, in response to determining a collective change associated with the concurrent changes in the plurality of data variables rises to a predetermined threshold, with the additional scenario or the modification to one of the plurality scenarios.

16. The computer program product of claim 15, wherein the third set of codes is further configured to cause the computer to determine by comparing the concurrent changes in the plurality of data variables to a baseline data variable level for each of the plurality of scenarios.

17. The computer program product of claim 15, wherein the third and fourth sets of codes are further configured to cause the computer to determine, by multivariate analysis, the concurrent changes in a plurality of the data variables in the first data set and identify, by multivariate analysis, (i) the additional scenario to add to the plurality scenarios, or (ii) the modification to one of the plurality of scenarios based on the concurrent changes in the plurality of data variables.

18. The computer program product of claim 15, wherein the fourth set of codes is further configured to cause the computer to identify, by implementing one or more clustering algorithms, (i) the additional scenario to add to the plurality scenarios based on an output of the one or more clustering algorithms indicating a presence of a previously unknown cluster or (ii) the modification to one of the plurality of scenarios based on an output of the one or more clustering algorithms indicating changes to a cluster associated with one the one of the plurality of scenarios.

19. The computer program product of claim 15, wherein the second set of codes is further configured to cause the computer to monitor, by the second machine learning model on a continuous basis, a second data set comprising data other than the data variables, the third set of codes is further configured to cause the computer to, in response to monitoring of the second data set, determine, by the second machine learning model, changes in the data that occur concurrent with the changes in the data variables, and the fourth set of codes is further configured to cause the computer to identify, by the second machine learning model, (i) the additional scenario to add to the plurality scenarios, (ii) the modification to one of the plurality of scenarios based on (a) the changes in the plurality of the data variables and (b) additional changes to the data.

20. The computer program product of claim 15, wherein the computer-readable medium further comprises:

a fifth set of codes for causing a computer to generate and initiate communication of an alert that indicates a need to retrain the first machine learning algorithm based on the identifying of (i) the additional scenario to add to the plurality scenarios, or (ii) the modification to one of the plurality of scenarios; and a sixth set of codes for causing a computer to execute a dashboard application that receives the alert and presents a user interface that displays a need to retrain the first machine learning algorithm based on the identifying of (i) the additional scenario to add to the plurality scenarios, or (ii) the modification to one of the plurality of scenarios.

\* \* \* \* \*